United States Patent [19]

Constant et al.

[11] Patent Number: 5,481,463

[45] Date of Patent: *Jan. 2, 1996

[54] PAY-PER-USE ACCESS TO MULTIPLE ELECTRONIC TEST CAPABILITIES

[75] Inventors: Amanda L. Constant; David W. Webb; Katherine Z. Withers-Miklos; Kay C. Lannen, all of Fort Collins; Ted T. Turner, Loveland, all of Colo.; Amos H.-K. Leong, Singapore, Singapore

[73] Assignee: Hewlett-Packard Company, Palo Alto, Calif.

[*] Notice: The termof this patent shall not extend beyond the expiration date of Pat. No. 5,412,575.

[21] Appl. No.: 388,765

[22] Filed: Feb. 15, 1995

Related U.S. Application Data

[63] Continuation of Ser. No. 132,987, Oct. 7, 1993, Pat. No. 5,412,575.

[51] Int. Cl.$^6$ .................................................. G07B 15/00
[52] U.S. Cl. .................... 364/464.01; 222/638; 222/639; 377/15; 377/16
[58] Field of Search ..................................... 222/638, 639; 364/464.01; 377/15, 16

[56] References Cited

U.S. PATENT DOCUMENTS

| | | | |
|---|---|---|---|
| 4,127,823 | 11/1978 | Frost | 328/130 |
| 5,386,369 | 1/1995 | Christiano | 364/464.01 |
| 5,412,575 | 5/1995 | Constant et al. | 364/464.01 |

Primary Examiner—Edward R. Cosimano

[57] ABSTRACT

A system and method for testing an electronic circuit is disclosed. The system includes a circuit board test platform having multiple electronic test capabilities, and a pay-per-use module that is coupled to the circuit board test platform. The pay-per-use module is adapted for monitoring use of the multiple electronic test capabilities of the circuit board test platform, and for debiting a number of usage credits from a usage credit pool based on the use of the multiple electronic test capabilities.

23 Claims, 3 Drawing Sheets

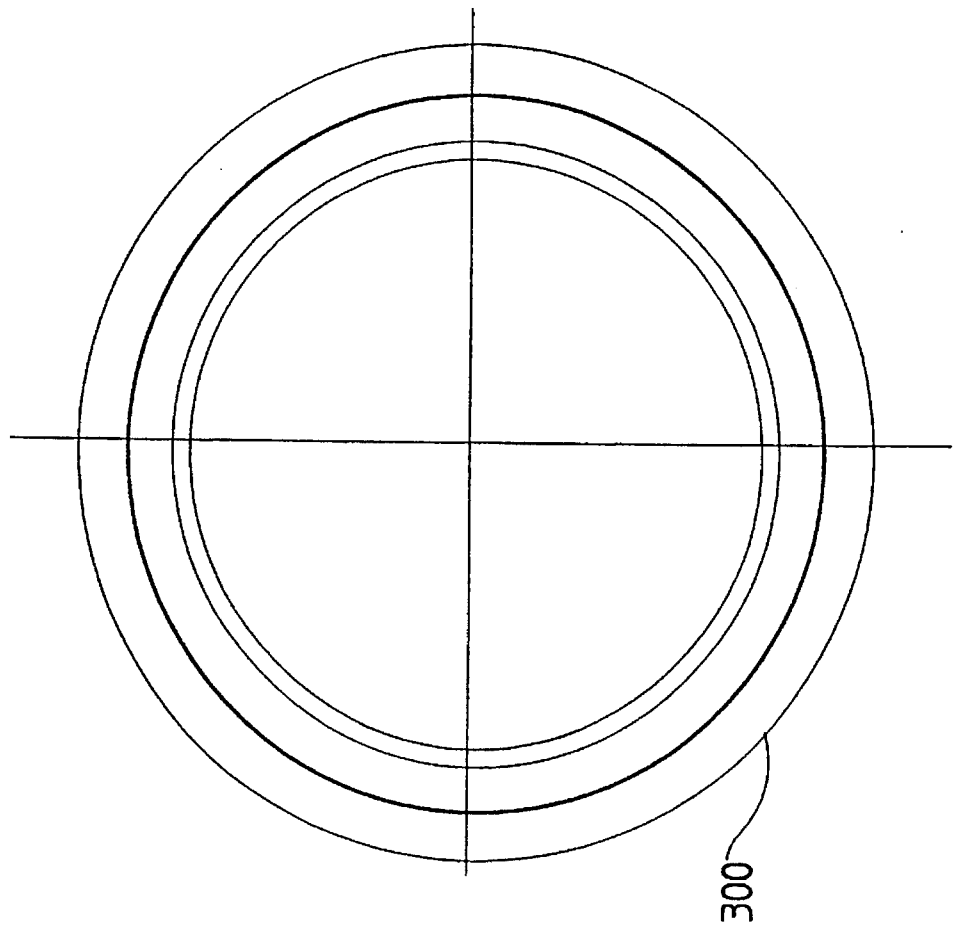
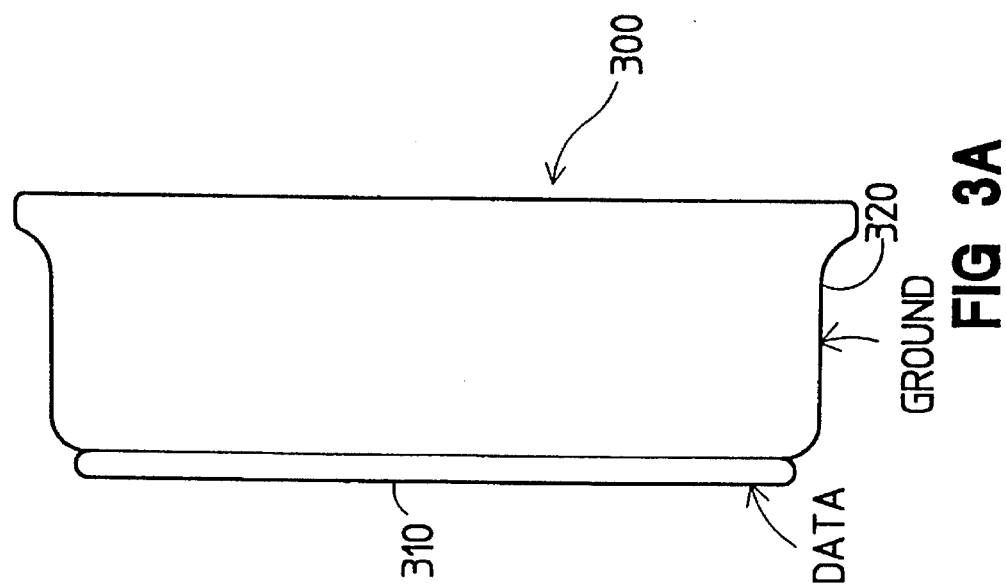

PAY-PER-USE ACCESS TO MULTIPLE ELECTRONIC TEST CAPABILITIES

CROSS REFERENCE TO RELATED APPLICATION

This is a continuation of application Ser. No. 08/132,987 filed on Oct. 7, 1993, now U.S. Pat. No. 5,412,575 issued May 2, 1995.

BACKGROUND OF THE INVENTION

1. Field of the Invention

The invention relates to electronic circuit board testing and, more particularly, this invention relates to a pay-per-use system and method for controlling access to a circuit board tester.

2. Related Art

Generally, a given circuit board consists of numerous interconnected semiconductor chips, such as a microprocessor, memory chips, counter chips, control chips, analog components, etc. After circuit boards have been assembled, but before they can be used or placed into assembled products, they must be tested to verify that all required electrical connections have been properly completed and that all necessary electrical components have been attached to the board in proper position and with proper orientation. Other reasons for testing are to determine and verify whether the proper components have been used. It is also necessary to determine whether each component performs properly (i.e., in accordance with the specification). Some electrical components also may require adjustment after installation.

Automated circuit board testing is performed with the aid of a circuit board testing machine. Circuit board testing machines are well known in the art. For example, a well known circuit board testing machine is the Hewlett-Packard Company Model HP-3075 Circuit Board Tester. The HP-3075, for instance, has pins (the number of pins depends on board configuration) which can simultaneously, selectively connect to various pins of a given circuit board for measuring components of the board. The HP-3075 is fully described in the HP 3070 Family Operating and Service Manuals available from Hewlett-Packard Company.

There are a variety of other circuit board testers which are commercially available. The type of circuit board tester utilized depends on the type of test that must be performed upon the circuit board. For example, an HP-3072U circuit board tester is used to perform a simple analog test on an analog circuit board or SMT open testing using HP TestJet software. A test that entails standard in-circuit analog testing, simple digital in-circuit testing, or analog functional testing, requires an HP 3072P circuit board tester. If more complex digital in-circuit testing is required, an HP 3073 circuit board tester with additional HybridPlus-6 cards and additional in-circuit software is required. Finally, if standard in-circuit digital and analog testing, analog functional testing, digital backtracing, fault dictionary testing, and timing set testing is required, an HP 3075 circuit board tester with HybridPlus-6 cards and combinational software is utilized. All of the above circuit board testers are available front Hewlett-Packard Co., Palo Alto, Calif.

The cost of a particular circuit board tester is a function of the type of tests it can perform. Different board types will require different capabilities. A manufacturer involved in building and testing many different types of boards will require much more capability in a circuit board tester than any one particular board needs. As such, it is not cost-effective to maintain a stock of circuit board testers, all of which are capable of performing the most complex testing.

The circuit board manufacturing and testing business is highly competitive. Test resources must be utilized in the most efficient way possible in order for a company to be competitive. Paying for equipment that sits on the production floor but it infrequently used is not an efficient use of resources. Furthermore, turning down business opportunities because of lack of test capabilities does not lead to new opportunities.

This places many manufacturers in a difficult position when it comes to board test hardware. They would like to have full combinational tester functionality (i.e., HP 3075 functionality) in order to perform complex testing at any given time, or to appeal to the widest range of customers. At the same time, they often cannot afford the capital investment of a full combinational tester. For example, a contract manufacturer may have only one customer out of ten that needs combinational test capabilities. The remaining nine customers may only require in-circuit functionality to test their boards. The contract manufacturer would like to accommodate all ten customers, but cannot justify the cost of a combinational tester when the more complex level of test is only required ten percent of the time.

Conventional solutions have focused on price/performance solutions relative to specific circuit board test systems. In these solutions, either the performance or the pricing of the circuit board test system is adjusted to meet the specific market demands. This is a good "point" solution. However, electronics manufacturers today face a broad spectrum of faults produced across a broad spectrum of circuit board complexities using a broad spectrum of manufacturing technologies. A point solution is inadequate to meet these needs. Point solutions result in duplication of similar but not the same test equipment, multi-vendor test solutions, multiple training requirements, multiple service and support vendors and contracts—all of this leading to a higher cost of test.

Consequently, what is needed is a system that will allow manufactures to have access to multiple electronic testing capabilities of a circuit board tester, without incurring the associated costs of purchasing the more expensive circuit board tester.

SUMMARY OF THE INVENTION

The invention provides a pay-per-use circuit board test system 100 that is adapted to control access to multiple test capabilities of a single circuit board tester. A pay-per-use access module is coupled to a circuit test system. The pay-per-use access module allows software control over hardware functionality.

The pay-per-use access module makes several checks at circuit board initialization time. These checks will determine if the circuit board test system testhead should be operated in pay-per-use mode, and if all the required hardware is present on the circuit board tester. When a circuit board is loaded, the charge rate will be determined from the board test capabilities being used. If only the base system capabilities are used the charge rate will be zero. When the start of the circuit board test segment is detected and it has been determined that there are still usage credits available in a usage credit pool, a timer will be started. When the end of the circuit board test segment is detected, the timer will be stopped and the available usage credit pool will be decremented appropriately. The timer will also be stopped when it is determined that the tester is not actually executing tests (i.e., is paused for board removal or manual operator intervention).

The user is able to set three levels of alarms to warn of a low usage credit balance. The alarms issued will be in increasing level of urgency (status, warning, critical). The user determines the credit balances (or remaining test times) appropriate for each level of alarm. When the pool of available usage credits is empty, a fourth alarm will be issued at the critical level, and no additional boards will be permitted to start testing.

During board test execution, statistics will be kept pertaining to the charge level of tests being executed and the usage credits expended. This information will be available to the user in report form.

Pay-per-use access allows electronics manufacturers to buy high-performance test hardware for low-performance entry prices. Only when incremental performance is required is the manufacturer charged for the capability. This is managed on a board-by-board basis. With only one test platform to maintain, electronics manufacturers can lower their overall cost of test by reducing hardware and software contract liabilities, having consistent training requirements for every test engineer, and standardizing test operator procedures, to name a few.

BRIEF DESCRIPTION OF THE FIGURES

The above and other features and advantages of the invention will be better understood by reading the following, more particular description of the invention, presented in conjunction with the following drawings, wherein:

FIG. 3 illustrates a schematic diagram of an authorization button.

DESCRIPTION OF THE PREFERRED EMBODIMENT

Figure 1:
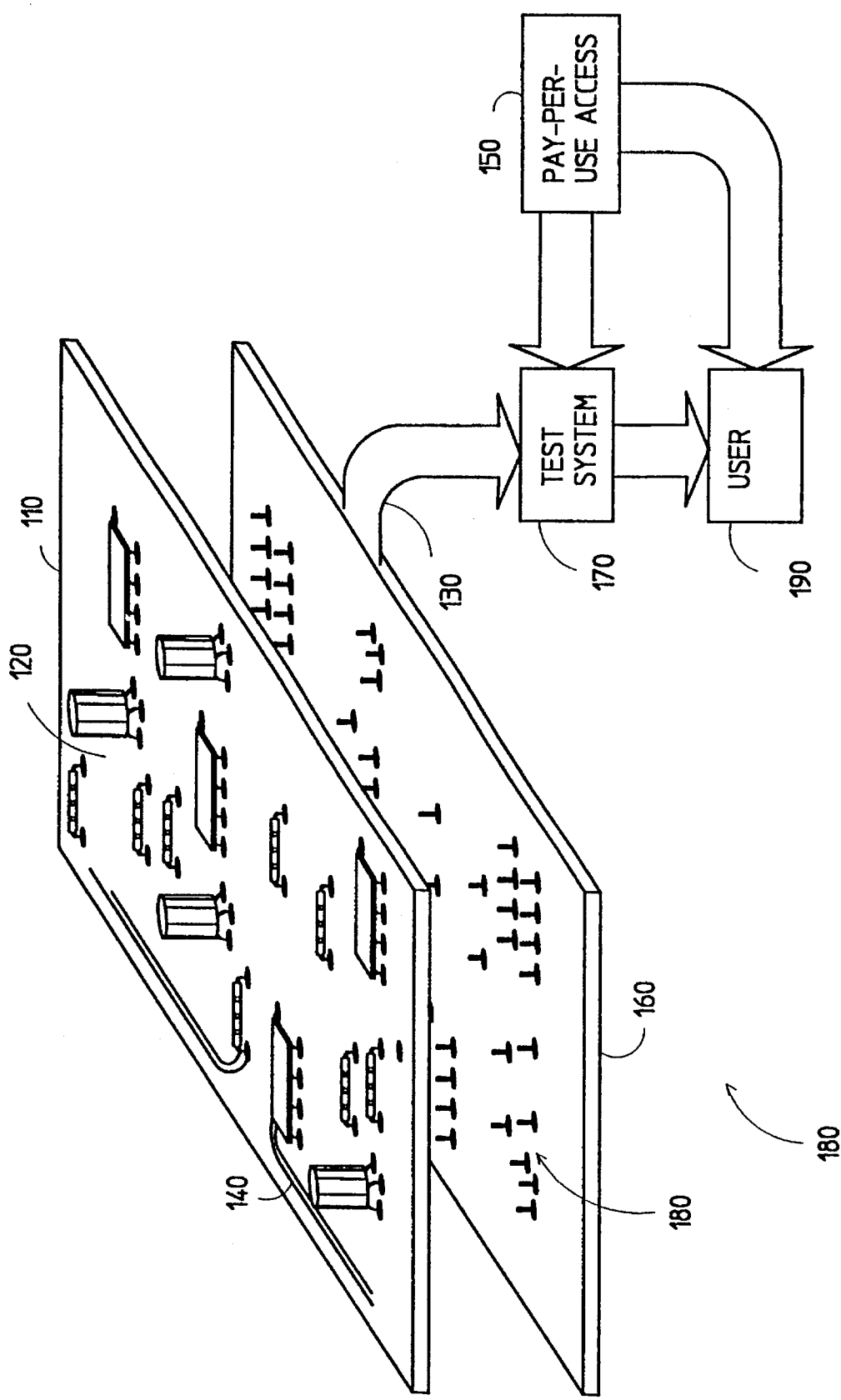
FIG. 1 illustrates a high level schematic diagram of a circuit board test system.

Referring to FIG. 1, the invention provides a pay-per-use circuit board test system 100 that is adapted to control access to multiple test capabilities of a single circuit board tester. The circuit board tester used in a preferred embodiment is the HP 3075 circuit board tester. The HP 3075 circuit board tester provides, for example, standard in-circuit digital and analog testing, analog functional testing, service mount technology (SMT) open testing, digital backtracing, fault dictionary testing, and timing set testing. This type of circuit board tester is referred to as a combinational tester.

There are several types of manufacturers that can benefit from use of the present invention. One type is a board manufacturer that builds and tests their own circuit boards. Another is a contract testing house that performs circuit board testing for other companies that manufacture circuit boards. Yet another is a contract manufacturer that builds and tests circuit boards for other companies. These types of manufacturers are referred to generally below by the term manufacturer.

The invention provides a software interface combined with the combinational tester hardware. That is, the pay-per-use system of the present invention is interfaced with a single test platform. It controls access to the multiple testing capabilities of the single test platform by managing a pool of usage credits. The pay-per-use system is adapted to monitor use of the multiple testing capabilities and to debit a number of usage credits from the usage credit pool based on the use of said multiple electronic test capabilities.

That is, a manufacturer purchases, for example, a combinational circuit board tester (i.e., a tester with multiple capabilities) and a pool of usage credits. However, the combinational circuit board tester has been adapted to only provide access to lower level capabilities (e.g., standard unpowered testing and SMT opens testing) without incurring additional charges. That is, the manufacture is limited to the lower level testing capabilities of the combinational tester. However, upon the debiting of usage credits in the credit pool, the user is provided with access to the higher level capabilities (e.g., the manufacture can obtain access to limited-powered testing, in-circuit testing, and combinational testing capabilities). The usage credit pool will be debited at a rate appropriate to the highest level of test-functionality employed by the board test. Usage credits will be debited as the tests are executed by the circuit board tester.

Note that although the preferred embodiment uses circuit board test equipment manufactured and sold by Hewlett-Packard, those skilled in the art will recognized that the present invention can be utilized with any type of circuit board tester. Furthermore, the present invention can be used with any hardware/platform software package that has more than one level of functionality.

FIG. 1 shows a high level schematic view of a circuit board tester operated in accordance with the present invention. Printed circuit board 110 has a plurality of both analog and digital components 120 connected by way of their component leads to a plurality of conductors 140 to form a circuit on the printed circuit board 110. Test bed 160 has a plurality of connector-pins 180 that function to contact conductors 140 at predetermined locations to apply test signals and detect responses at predetermined locations within printed circuit board 110. Conductors 130 connect the connector pins 180 to test system 170. Test system 170 includes the necessary signal generators and signal-processing equipment to perform the testing operations and analysis, and provide information to the user 190. The information indicates the test results for printed circuit board 110.

The test system 170 is loaded with a testplan which provides supervisory control over testing. This includes, for example, sequencing the tests, logging the results, controlling board/fixture interfacing, controlling the test power supplies, etc. That is, the testplan is a program that controls the execution of tests in the circuit board tester 100.

A pay-per-use access module 150 is coupled to the test system 170. The pay-per-use access module 150 makes several checks at circuit board initialization time. These checks will determine if the circuit board tester 100 should be operated in pay-per-use mode, and if all the required hardware is present on the circuit board tester 100. When circuit board information is loaded into the testhead 160, the charge rate (i.e., number of credits per unit time) will be determined from the board test capabilities being used. When the start of a circuit board test segment is detected via a start test function and it has been determined that there are still usage credits available in a usage credit pool, a timer will be started. When the end of a circuit board test segment is detected via a stop test function, the timer will be stopped and the available usage credit pool will be decremented appropriately. The timer will also be stopped when it is determined that the tester is not actually executing tests (e.g., paused for board removal or data entry). This functionality will be described in greater detail below.

Referring to FIGS. 3A and 3B, an authorization button 300 is used for credit counting (i.e., pay-per-use access of the test system 170), as well as other aspects of system security. The authorization button 300 is a secure microchip that controls execution rights to the test system 170. That is, the authorization button 300 controls the right to execute rather than the right to copy the software.

Generally, authorization buttons are inexpensive commercial devices which are inserted in a button holder (not shown) attached to the serial or parallel port through which they are accessed by software applications. The I/O port may remain usable by other applications and the operating system. In a preferred embodiment, the authorization button 300 is loaded with the minimum credit purchase amount (e.g., 50,000 units). The authorization button 300 is not locked to any particular customer or to any particular hardware. That is, customers can move them from testhead to testhead without penalty.

Testplans requiring more than the minimum test capabilities of the circuit tester will run only when the authorization button 300 has at least some remaining credits. When a testplan segment completes (i.e., a stop timing point has been reached), the appropriate number of credits will be deducted from the authorization button 300.

Some button holders can carry more than one button. If multiple credit buttons are loaded, when one is empty, a message will appear on the screen indicating that the next button is being switched to and that the user should make sure that the empty button is replaced. As long as credits remain, a circuit board test will be allowed to begin. If all remaining credits (on all buttons) are depleted during a test, no additional circuit board tests are permitted until a new button is inserted into the button holder. The tester will only operate at the minimum functionality level (e.g., unpowered tester) if no authorization button 300 is found or no credits are contained in the authorization button 300.

Button access routines provide the ability to read the current credit balance on the button and write a new balance to the button, as well as verify system security.

The preferred embodiment uses an authorization button manufactured by Dallas Semiconductor of Dallas, Tex. The authorization button 300 is packaged in tamper-proof, 16 mm stainless steel container. Physical tampering with the authorization button 300 will destroy its contents, rendering it useless. The authorization button 300 used in a preferred embodiment contains password protected nonvolatile read/write memory. This provides the ability to update information (i.e., credit information) when it is in the field at the end user site (i.e., chip manufacturer or contract manufacturer).

In a preferred embodiment, the authorization button 300 is interfaced to the tester via a DS141 button holder (not shown) also available from Dallas Semiconductor.

Communication with the authorization button 300 is via a consistent 1-wire interface. The bottom 310 of the authorization button 300 is the data pin and the flange 320 is ground. Dialogue with the authorization button 300 is via a pulse-width modulation protocol. An application programming interface (not shown), provided by Dallas Semiconductor, provides the link between the pay-per-use system access module 150 and the authorization button 300. The access software manages the 1-wire interface and identifies all authorization buttons present on the port. Additional information regarding the access software can be found in the DS141xK Button Developer's Kit available from Dallas Semiconductor. Additional documentation on the authorization button 300 is also available from Dallas Semiconductor.

The pay-per-use circuit board test system 100 can be implemented two ways. The first is to require the manufacture to pay in advance for a block of usage credits which would equate to a specific amount of test time available in each of the three incremental charge modes. Note that although three incremental charge modes are used in the preferred embodiment, the present invention is not limited to any number of incremental charge modes. The second is to meter the usage of the tester in each of the three incremental charge modes, and to bill the customer periodically. In a preferred embodiment, the pay-in advance scenario is implemented, and is described in detail below.

The pay-per-use circuit board test system can also be implemented using a scheme of counting the number of times selected tests are executed, (rather than timing tester usage) and deducting credits based upon the number of tests and the level of capability employed in the tests. In a preferred embodiment, the timer scenario is implemented, and is described in detail below.

Figure 2:
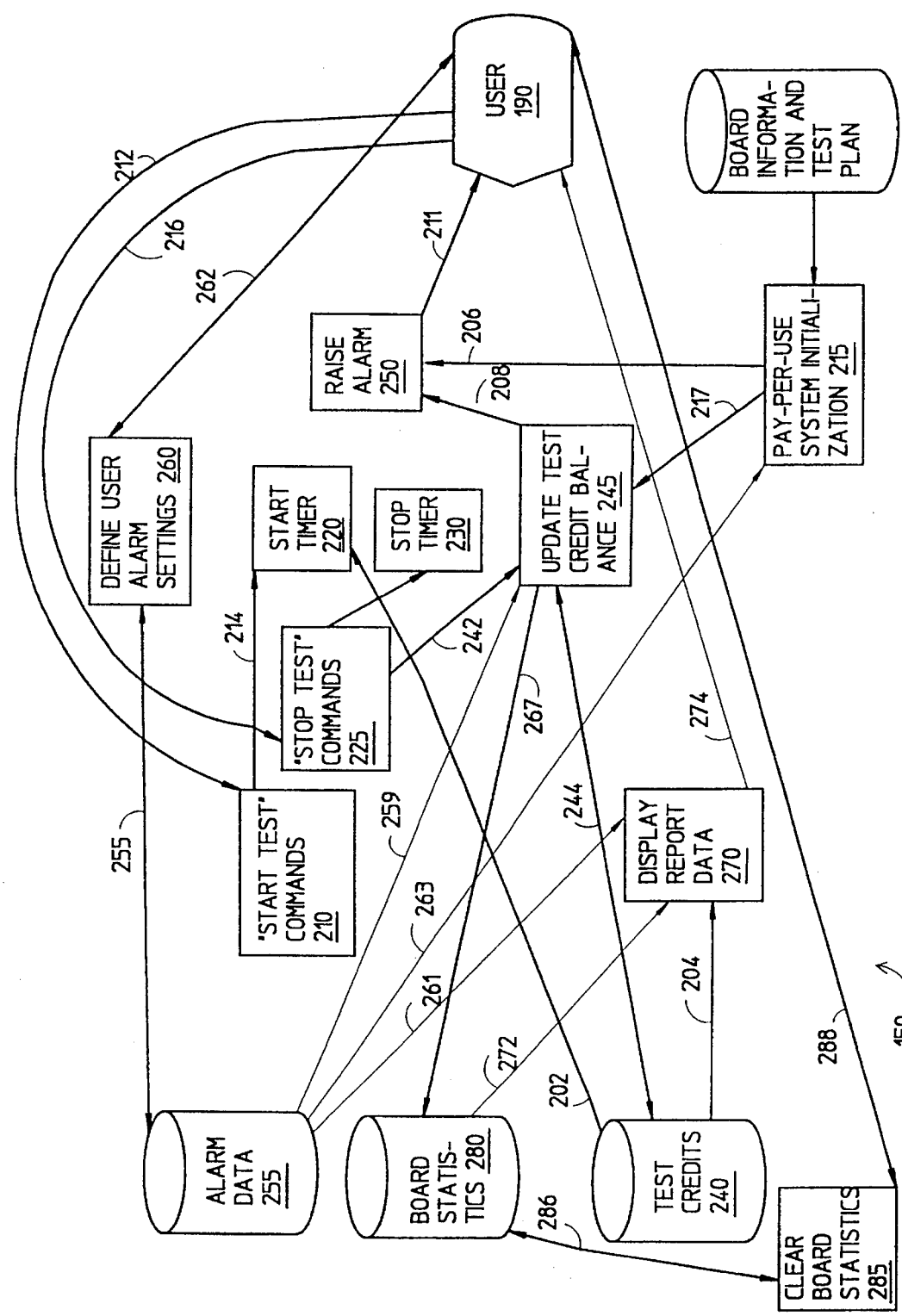
FIG. 2 illustrates a block diagram of a pay-per-use test system 100 which is coupled to the circuit board test hardware.

FIG. 2 shows a detailed block diagram of the pay-per-use access system 150. The user 190 has access to the different capabilities of the pay-per-use system 150, and accesses these capabilities via a defined set of commands (defined in the testplan).

The user loads board information and a testplan into the test system 170 when he/she is preparing to test a circuit board. Once the board information is loaded, the pay-per-use system 150 determines which capabilities of the tester are required to test the circuit board. The present invention provides four levels of testing: (1) unpowered tests, (2) simple limited-powered tests, (3) full in-circuit tests, and (4) combinational tests. Each test level has an associated charge level. Note that in a preferred embodiment there is no charge associated with an unpowered test. As would be apparent to a person skilled in the relevant art, the present invention can be operated such that all test levels, including the lowest test level (e.g., an unpowered test), have an associated charge. The charge level for the entire board is based on the highest capabilities used (as determined by the board description information). This charge level is stored in the pay-per-use system initialization module 215. The update usage credit balance module 245 (hereinafter balance module 245) is updated with the current charge level via connection 217 during pay-per-use software initialization.

Once the charge level has been determined and the circuit board has been loaded, the user initiates the circuit board test by executing (via line 212) a "start test" command 210. This command triggers (via line 214) the start of a timer, as shown in module 220.

The start module 220 has access to the usage credit pool 240 via line 202. The usage credit pool stores the available usage credits. The start module 220 is configured to prevent the beginning of a chargeable circuit board test if there are not enough usage credits available in the usage credit pool 240. The current contents of the usage credit pool 240 can be provided to a display report module 270 via line 204. This information can then be accessed by the user.

The timer maintains a record of the amount of time that has elapsed during the testing of the circuit board. The timer can be stopped (via line 218) by the user by executing (via line 216) a "stop test" command 225, such as a "pause" or "break" or "exit" command, as shown in module 230. Once one of the stop test commands 225 has been executed, the tester is idle and the timer has stopped timing the testing. That is, the pay-per-use system 150 is not deducting credits from the usage credit pool 240. The balance module 245 updates the test credit balance via line 242.

The stop test command stops the timer as indicated in block 230. Once the timer is stopped, the balance module 245 is accessed (via line 244) and the user's usage credits are updated. As discussed above, the balance module 245 has previously been updated with the current charge level by module 215 during system initialization. The balance module 245 accesses the usage credits pool 240, via a bidirectional line 244, to calculate the updated usage credit balance.

In particular, the balance module 245 calculates the updated balance by multiplying the charge level with the total elapsed time in the timer. This number is subtracted front the usage credit total stored in the usage credits pool 240 which results in the updated balance. The updated balance is then stored back into the usage credit pool 240. Furthermore, the updated balance is also provided to the board statistics module 280 (described below) via line 267.

If a staff test command 210 is subsequently executed, the timer is once again started, and the testing of the circuit board can continue. The pay-per-use system 150 only charges for time while the tester is actively testing the circuit board. Idle time for changing boards or data entry is not charged to the user.

The pay-per-use system 150 also provides a status alarm 250. In a preferred embodiment, the alarm is programmed to provide three default alarm levels. The user can change the default alarm levels via an application program 260. This is indicated by line 262. The changes are then stored via line 256 to the alarm data file 255.

Regardless of how the alarm levels are set (i.e., default or user defined), the alarm levels are stored in alarm data file 255. The alarm file 255 provides this information to the balance credit module 245 via line 259, the report module 270 via 261, and the initialization module 215 via line 263.

The first level alarm is referred to as a status alarm. The status alarm indicates that the number of credits has reached a first alarm level (e.g., 40 hours of usage credits left). As such, the number of usage credits should be increased as soon as possible. The second level alarm is referred to as a warning alarm. The warning alarm signals when the number of credits has reached a second alarm level (e.g., 20 hours of usage credits left). The third, and final, alarm level is referred to as a critical alarm. In a preferred embodiment, the critical alarm signals when the number of credits is slightly greater than the number of credits needed to operate the tester for one shift (e.g., slightly greater than 8 hours).

The number of credits equating to an hour worth of usage will be determined by the charge level of the circuit board currently being tested when the alarm is triggered.

In a preferred embodiment, the pay-per-use system 150 is programmed to alert the user (via line 211 ) when alarm levels are reached. The particular warning level is displayed to the user 190 with a unique color. The pay-per-user test system 150 checks for alarm conditions after either initializing the pay-per-use system software or after performing a balance update. During initialization the alarm file is checked via line 206 and during a balance update it is checked via line 208.

In a preferred embodiment, the system allows for the installation of a "spare tank" of credits. This allows the testing to continue on the "spare tank" button (not shown) while the replacement for the empty button is purchased and installed. However, there must always be a positive balance of credits to begin or continue testing at incremental levels.

Also in a preferred embodiment, the run-time test system 170 receives information about the authorization credit button 300. The run-time software (not shown) will halt with an exception if the pay-per-use access system 150 is disconnected from the authorization credit button 300, if the adaptor which the authorization button 300 plugs into is missing, or if the authorization button 300 is empty. Note that in a preferred embodiment, if an "unpowered only" testplan is being executed (i.e., does not use tests which debit the credit pool), the pay-per-use system 150 does not require that an authorization button to be attached to the test system 170.

To safeguard against a manufacture trying to override or disconnect access to the authorization button 300 during a balance update, the present invention implements a "pending update" scheme for security purposes. The pending update is implemented if a balance update is attempted and the pay-per-use system 150 does not detect that an authorization button 300 is connected to the test system 170. The pay-per-use system 150 will save the update information until a new start command is given, at which point the pay-per-use system will update the credit balance in the re-attached authorization button 300 before allowing testing to resume.

The final set of modules within the pay-per-user test system 150 centers around circuit board testing statistics. All circuit board test statistics are stored in data file 280. Examples of board test statistics include the identification (ID) for a circuit board, the first date on which a board with that ID was tested, the most recent date in which a board with that ID was tested, the level of test at which the circuit board is charged, and the total number of credits which have been used to test circuit boards with that ID. All of this information is forwarded to module 270 via line 272 which compiles all the information and presents a report on the pay-per-use access system 150. The report is available to the user 190.

A clear board statistics program 285 is provided to the user 190, as shown by line 288. Program 285 allows the user to clear the board statistics data file 280 either entirely or on a board ID by board ID basis via line 286.

The report program 270 provides data on all aspects of the pay-per-use access system 150. The report program 270 provides the current date, the current usage credit balance in all credit buttons found, and the total test time remaining for each credit button based on the current usage credit balance of that credit button. This test time data is calculated for each of the three incremental levels of test. The report program 270 also prints the current values of the user-definable alarm settings and the board statistics. The report program 270 provides this information to the user 190 via line 274.

In a preferred embodiment, users of the pay-per-use system are only charged for actual testing time. In other words, there will be no charge for program development, pauses for data entry during tests, system diagnostics, etc.

Security and/or integrity of the system is essential. If the credit button becomes corrupt a warning is posted and a new button will have to be inserted to continue testing. The present invention protects against customer created credit buttons by providing a proprietary access password. Without knowledge of the password, the manufacture cannot create a credit button which the pay-per-use system 150 will recognize. Thus, the manufacture will no be able to obtain access to the incremental testing capabilities of the circuit board tester. It is also essential that the pay-per-use software cannot be turned off by the customer. Furthermore, credit button security cannot be breached by intercepting transmissions to and from the port to which the authorization button 300 is attached.

Customers cannot reduce their charge level by modifying their board configuration to imply a lesser test capability than is actually programmed. Test objects will check at execution time to insure a match between the capabilities specified in the board configuration at run-time versus those specified when the test object was created.

What is unique about the pay-per-use test system 150 is that it changes how electronic manufacturers purchase test time. Primarily, pay-per-use reduces the initial capital investment and increases the on-going expense. This financial model is consistent with the way manufacturers use testers. Slightly reducing the capital cost of testers (discount, price reductions) is inadequate because the amount of reduction is limited by the loss of revenues to the test vendor. Pay-per-use creates an annuity flow of revenues allowing the initial capital cost of the test equipment to be greatly reduced, and the loss of revenue to the test vendor to be replaced over time with the annuity "expense" payments associated with actually using the test system.

Pay-per-use access allows electronics manufacturers to buy high-performance test hardware for low-performance entry prices. Only when incremental performance is required is the manufacturer charged for the capability. This is managed on a board-by-board basis. With only one test platform to maintain, electronics manufacturers can lower their overall cost of test by reducing hardware and software contract liabilities, having consistent training requirements for every test engineer, and standardizing test operator procedures, to name a few.

In an alternate embodiment, the pay-per-use system 150 can be implemented in a network licensing scenario. In conventional network licensing system, a plurality of computers are coupled together in a computer network (e.g., local area network). The network is also connected to a license server that includes one or more software packages that can be shared across the network. The owner of the network purchases from the software developer a plurality of licenses for a particular software package. That is, if the network owns three licenses, only three users can access the software package at any given time.

In contrast, by connecting the pay-per-use system 150 to a computer network, a user can access a software package by debiting credits from a pool of usage credits. Different software packages or groups of packages, would have their own usage credit pools and might cost a different number credits per unit of time or usage. Under this system, there is no set number of users that can access the software package at one time. Rather, the use of a software package is only limited by the number of usage credits available for a particular software package.

Those skilled in the art will readily appreciate the changes that would have to be made to the pay-per-use system 150 to implement a pay-per-user network license.

Another alternate usage of the authorization button 300 is to store a simple right to execute code on the authorization button 300 to enable a user to access advanced software or hardware capabilities for a one-time charge (e.g., cost of purchasing the button). There would not be usage credit deductions in this scenario. Authorization buttons can also be used to identify the type of system that is being used. That is, the authorization button would indicate whether the system is operating under a pay-per-use mode or as a full access combinational tester without limitations. As will become readily apparent to those skilled in the art the above usages of the authorization button 300 can be used individually, or in combination.

While the invention has been particularly shown and described with reference to preferred embodiments thereof, it will be understood by those skilled in the an that various changes in form and details may be made therein without departing from the spirit and scope of the invention.

What is claimed is:

1. A system for testing an electronic circuit, comprising:
    (a) a circuit test platform having multiple electronic test capabilities; and
    (b) a pay-per-use module, coupled to said circuit test platform, for monitoring use of said multiple electronic test capabilities of said circuit test platform, and for debiting a number of usage credits from a usage credit pool based on said use of said multiple electronic test capabilities.

2. The system of claim 1, wherein said circuit tester is a combinational tester.

3. The system of claim 1, further comprising one or more authorization buttons that contains said usage credit pool, wherein said one or more authorization buttons are loaded with a predefined number of credits.

4. The system of claim 1, wherein said usage credit pool is secured against tampering and/or unauthorized user modification.

5. The system of claim 1, wherein said pay-per-use module further comprising a statistics module for storing information that relates to a circuit test, and a report module, connected to said statistics module, that compiles all of said information and generates a report.

6. The system of claim 1, wherein said pay-per-use module comprises means for detecting the highest level of capability employed in the testing of the electronic circuit.

7. The system of claim 1, wherein use of at least one of said electronic test capabilities does not require said usage credit pool to be debited.

8. The system of claim 1, further comprising means for determining whether one of said electronic test capabilities is operable at a base level that does not require said usage credit pool to be debited.

9. The system of claim 8, wherein said pay-per-use module comprises means for not allowing testing on said circuit test platform, other than at said base level, if there are insufficient credits in said usage credit pool.

10. The system of claim 1, wherein said pay-per-use module comprises a counter that is incremented by initiating selected circuit tests, said counter maintains a record of the number of said selected circuit tests performed by said circuit test platform, wherein said usage credit pool is debited as a function of said selected circuit tests recorded by said counter.

11. The system of claim 10, wherein said pay-per-use module further comprising:
    authorization means for storing said usage credit pool; and
    a balance module, connected to said counter and said authorization means, for calculating a deduction of usage credits based on a charge level and the number of said selected circuit tests recorded by said counter.

12. The system of claim 1, wherein said pay-per-use module comprises a timer that is activated by initiating a circuit test start function and is stopped by initiating a circuit test stopping function, said timer maintains a record of elapsed time to perform a circuit test, wherein said usage credit pool is debited as a function of said record of elapsed time and which of said multiple electronic test capabilities are used.

13. The system of claim 12, wherein said pay-per-use module further comprising:

authorization means for storing said usage credit pool; and a balance module, connected to said timer and said authorization means, for calculating a deduction of usage credits based on a charge level and the amount of time recorded by said tinier, wherein said usage credit pool is reduced by said deduction.

14. The system of claim 13, wherein said pay-per-use module further comprising a status alarm, connected to said balance module, for indicating when the number of remaining usage credits has reached an alarm level.

15. A computer-implemented method for controlling access to the multiple capabilities of a circuit tester, the circuit tester having coupled thereto a credit pool that is loaded with a pool of usage credits, the method comprising the steps of:

(1) initiating a circuit test segment according to a testplan;

(2) determining from said testplan which capabilities of the circuit tester are required to perform said circuit test;

(3) determining a charge level based on said required capabilities;

(4) determining an elapsed time to perform said circuit test segment, said test segment determined by a circuit test start function and a circuit stop function;

(5) calculating a number of usage credits to be deducted from the pool of usage credits for performing said circuit test segment based on said elapsed time and said charge level;

(6) deducting said number of usage credits from the pool of usage credits; and (7) providing a status alarm if the number of usage credits in the pool of usage credits falls below an alarm value.

16. The method of claim 15, wherein said alarm value can be changed by a user.

17. The method of claim 15, further comprising the step of providing a report on different aspects of circuit tests.

18. The method of claim 15, further comprising the step of destroying the contents of the credit pool if tampering is detected.

19. The method of claim 15, further comprising the step of limiting testing to at least one of said multiple test capabilities if there are insufficient credits in said credit pool.

20. A system for charging a user on a pay-per-use basis for access to the multiple capabilities of a circuit tester, comprising:

(a) authorization means for storing a usage credit pool;

(b) a pay-per-use module, coupled to the circuit platform, for monitoring use of said multiple electronic test capabilities of the circuit test platform, and for debiting a number of usage credits from said usage credit pool based on said use of said multiple electronic test capabilities.

21. The system of claim 20, wherein said pay-per-use module comprises:

(1) a timer that is activated by initiating a circuit test start function and is stopped by initiating a circuit test stopping function, wherein said timer maintains a record of the amount of time that has elapsed during said circuit test;

(2) a balance module, connected to said timer and said authorization means, for calculating a deduction of usage credits based on a charge level and the amount of time recorded by said timer, wherein said test credit pool is reduced by said deduction; and (3) a status alarm, connected to said balance module, for indicating when the number of remaining usage credits has reached an alarm level.

22. The system of claim 21, wherein said authorization means contains a system identification which indicates which type of system is running.

23. The system of claim 21, wherein said authorization means is loaded with a right to execute code word for a particular software package.

* * * * *